Patented Oct. 27, 1925.

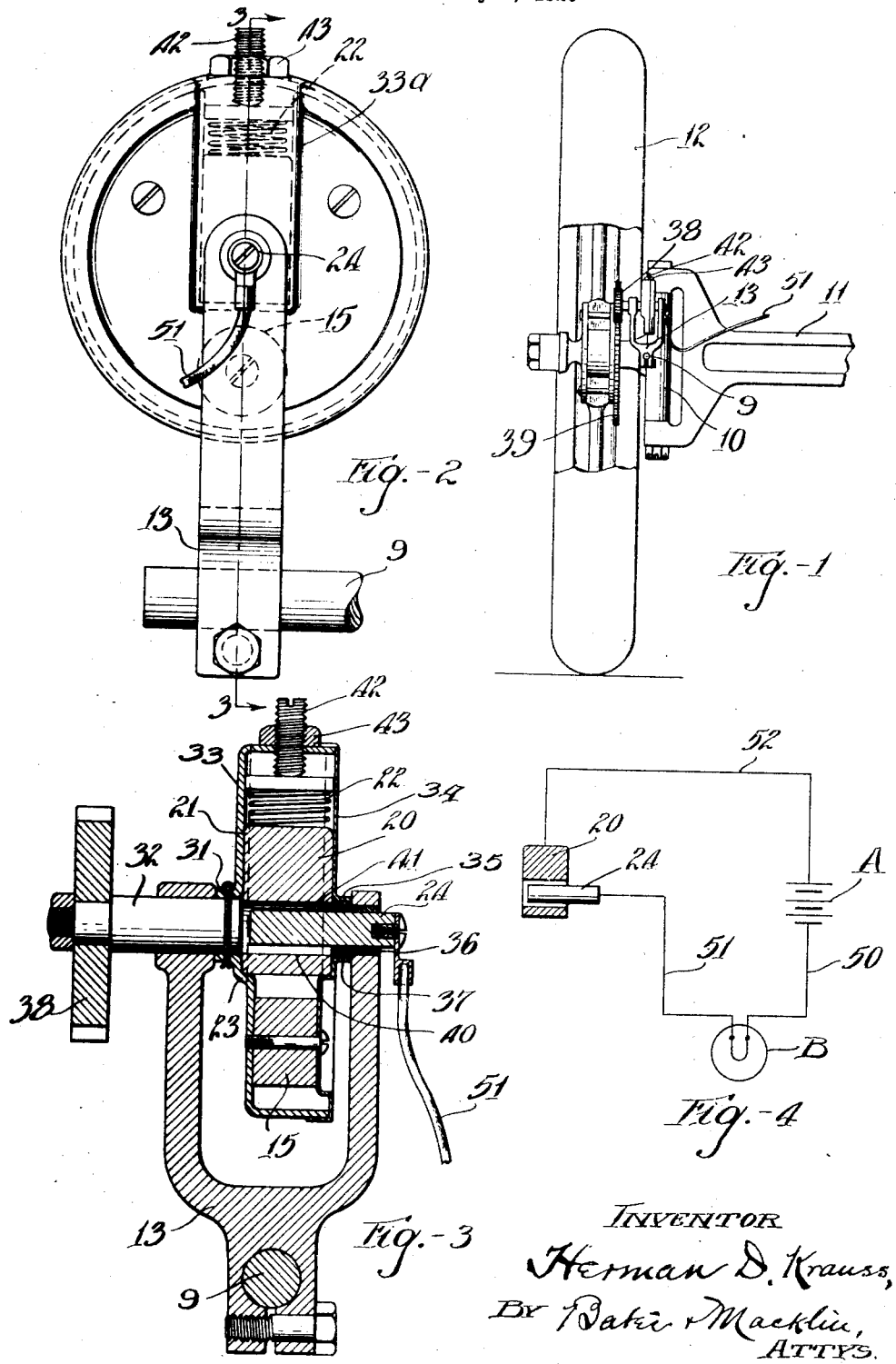

1,558,487

UNITED STATES PATENT OFFICE.

HERMAN D. KRAUSS, OF LAKEWOOD, OHIO.

SPEED INDICATOR.

Application filed May 7, 1923. Serial No. 637,174.

*To all whom it may concern:*

Be it known that I, HERMAN D. KRAUSS, a citizen of the United States, residing at Lakewood, in the county of Cuyahoga and State of Ohio, have invented a certain new and useful Improvement in a Speed Indicator, of which the following is a full, clear, and exact description, reference being had to the accompanying drawings.

This invention relates particularly to means which may be mounted on a motor vehicle for warning the driver whenever the vehicle is traveling at or above a predetermined rate of speed.

One of the objects of my invention is the provision of a simple device which may be readily attached to motor vehicles and operatively connected with one of the movable elements for indicating on the instrument board, or by any other satisfactory means, whenever the vehicle is traveling at or beyond a predetermined speed; this predetermined rate of travel being the speed limit determined by law.

Other objects of my invention include the provision of a device which may be cheaply manufactured, which has few working parts, and which may be readily connected to operate on any one of various movable parts on a motor vehicle.

The means for accomplishing the above objects is illustrated by the preferred arrangement in the accompanying drawings, and is hereinafter described in detail. The essential characteristics of my invention are summarized in the claims.

In the drawings, Fig. 1 illustrates diagrammatically the front axle and wheel of a motor vehicle having my invention attached to the steering link and operatively connected to the wheel; Fig. 2 is a side elevation of my device; Fig. 3 is a vertical transverse section through the device shown in Fig. 2; and Fig. 4 is a wiring diagram.

My invention broadly comprises a member which when rotated is caused by centrifugal force to actuate a signal when the speed of the vehicle has attained a predetermined degree. In the preferred form, I have shown my invention as attached to an extension 9 on a steering knuckle 10. This knuckle is disposed adjacent the front axle 11 and wheel 12 of a motor vehicle. The device may be carried on a yoke 13 which comprises a supporting bracket that is well adapted for attachment to a part of the steering mechanism.

The signal illustrated comprises a lamp B which may be mounted on the instrument board and which may be electrically connected with the control device. The device for closing the circuit to the signal preferably comprises a piston 20 which is movable within a housing 21, and which is normally held in the position indicated in Fig. 3, by a spring 22. In this position, the bottom of the piston is in engagement with a shoulder 23 and out of engagement with a stationary contact member 24. When the piston is in this position, the signal is off.

The housing for supporting the piston 20 preferably comprises a cylindrical casing 21 having a portion thereof protruding outwardly, as at 33, to form guides for the piston. The housing may be supported by a flange 31 which is rigidly connected to a shaft 32. The casing may be closed by a cover plate 34. This plate may also have a protruding portion as at 33ª to guide the piston, and may have a flange, as at 35, which is journaled on a sleeve 36. A metallic band 37 is preferably interposed between the sleeve and the flange 35 to obtain a satisfactory bearing. To counterbalance the piston, I have shown a weight 15 which is disposed between the housing and plate.

The shaft 32 is journaled in one arm of the yoke and may be provided with a pinion 38 which is adapted to mesh with a gear 39 on the wheel 12.

Assuming that a device constructed according to my invention is attached to one of the movable parts on the motor vehicle, then when the vehicle is at rest, the piston 20 will be in a position indicated in Fig. 3. When the vehicle is in motion, the piston being supported in off-center position, is moved outwardly by centrifugal force against the tension of the spring 22. This outward movement continues as the speed of the vehicle is increased until the shoulder 40 in the slot 41 engages the contact member 24 whereupon an electrical circuit to the signal is completed. The tension on the spring may be adjusted by the cooperating spindle and nut 42 and 43 respectively, to cause engagement between the piston and contact member and thereby to actuate the signal, only when the vehicle has attained a predetermined speed.

When the vehicle has attained the predetermined speed for which the device is set, then a circuit will be completed as follows:—battery A, line 50, lamp B, line 51, contact member 24, piston 20, line 52 and thence back to the battery. The signal lamp B is preferably mounted in some convenient position such as on the instrument board, but if desired the lamp may be replaced by an audible signal.

From the foregoing description it will be seen that a device constructed according to my invention has few movable parts which may be readily assembled and easily attached to motor vehicles for warning the driver when the vehicle has attained a predetermined speed.

Having thus described my invention, I claim:—

1. In a device of the character described the combination with a support, of a rotary driving member journalled therein, a driven hollow member rigidly mounted upon the driving member and having an opening in alignment with the axis of the driving member, a stationary contact member carried by said support and projecting into the driven member through said opening, a movable contact member mounted radially within the driving member and normally held out of engagement with the stationary contact member when the speed of the driving member is below a predetermined value, said movable contact member being adapted to engage the stationary contact member when the speed of the driven member reaches a predetermined value whereby an electric circuit is completed through said contact members.

2. In a device of the character described the combination with a bifurcated support, of a rotary driving member journalled in one arm of said support, a rotary driven member disposed between the arms and rigidly connected to one end of the driving member intermediate said arms, said driven member having a radially extending guideway therein, a stationary contact member carried by an arm of the support and projecting into the driven member, a movable contact member slidably mounted within the guideway, means for normally holding the contact members out of engagement with each other when the speed of the driven member is below a predetermined value, said contact members being adapted to engage each other whenever the speed of the driven member reaches a predetermined value whereby an electric circuit is completed through said members.

3. In a device of the character described, the combination with a bifurcated support, of a rotary driving member journalled in one arm of the support and a stationary contact member rigidly mounted in the other arm of the support, the axes of said members being in alignment, a hollow casing rigidly mounted on the driving member and enclosing said stationary contact member, a movable contact member slidably mounted within the casing, a spring normally holding the movable contact member out of engagement with the stationary contact member, and means for adjusting the tension of the spring to permit engagement between said contact members when the speed of the casing reaches a predetermined value, an electric circuit associated with the contact members, said circuit being completed when the contact members are brought into engagement with each other.

In testimony whereof, I hereunto affix my signature.

HERMAN D. KRAUSS.